(12) United States Patent
Mampe

(10) Patent No.: US 8,113,541 B2
(45) Date of Patent: Feb. 14, 2012

(54) VEHICLE SUPPLEMENTAL RESTRAINT SYSTEM CONFIGURATION AND METHOD

(75) Inventor: Christopher Mampe, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 12/419,197

(22) Filed: Apr. 6, 2009

(65) Prior Publication Data

US 2009/0256339 A1 Oct. 15, 2009

Related U.S. Application Data

(60) Provisional application No. 61/042,708, filed on Apr. 4, 2008.

(51) Int. Cl.
B60R 21/16 (2006.01)

(52) U.S. Cl. ............ 280/735; 296/187.08; 296/187.01; 701/45; 180/274

(58) Field of Classification Search .................. 280/735; 180/274; 296/187.01, 187.08; 701/45
See application file for complete search history.

(56) References Cited

U.S. PATENT DOCUMENTS

| | | | | |
|---|---|---|---|---|
| 2,851,302 A * | 9/1958 | Owen | | 296/204 |
| 5,411,289 A | 5/1995 | Smith et al. | | |
| 5,746,444 A * | 5/1998 | Foo et al. | | 280/735 |
| 6,005,479 A | 12/1999 | Ide | | |
| 6,073,992 A * | 6/2000 | Yamauchi et al. | | 296/203.01 |
| 6,076,877 A | 6/2000 | Krieg et al. | | |
| 6,095,553 A * | 8/2000 | Chou et al. | | 280/735 |
| 6,304,004 B1 | 10/2001 | Meyer et al. | | |
| 6,341,252 B1 * | 1/2002 | Foo et al. | | 701/45 |
| 6,459,366 B1 * | 10/2002 | Foo et al. | | 340/436 |
| 6,530,597 B1 * | 3/2003 | Nesper et al. | | 280/735 |
| 6,595,544 B1 * | 7/2003 | Hermann | | 280/735 |
| 6,666,292 B2 | 12/2003 | Takagi et al. | | |
| 6,705,667 B1 * | 3/2004 | Bartesch et al. | | 296/187.01 |
| 6,846,038 B1 * | 1/2005 | White et al. | | 296/193.11 |
| 6,898,498 B1 * | 5/2005 | Wessels et al. | | 701/45 |
| 6,917,866 B2 * | 7/2005 | Grotendiek et al. | | 701/45 |
| 6,970,778 B1 * | 11/2005 | Feser et al. | | 701/45 |
| 7,055,640 B2 * | 6/2006 | Cook | | 180/284 |
| 7,137,472 B2 * | 11/2006 | Aoki | | 180/274 |
| 7,278,657 B1 * | 10/2007 | McCurdy | | 280/735 |

(Continued)

*Primary Examiner* — Paul N Dickson
*Assistant Examiner* — Nicole Verley
(74) *Attorney, Agent, or Firm* — Kenealy Vaidya LLP; Mark E. Duell

(57) ABSTRACT

A vehicle supplemental restraint system (SRS) can include an SRS control unit located rearward of the instrument panel in the vehicle. The SRS control unit can be located at or connected to a cross member of the vehicle frame that is located rearward of the instrument panel in the vehicle such that signals from a side sensor attached to a side portion of the vehicle frame are quickly transmitted to the SRS control unit with high signal strength. A space in the control panel or in the instrument panel of the vehicle can then be used to house a multi-axis or single axis satellite sensor to increase signal strength and sensor accuracy and speed for the front crash sensor or sensors in the vehicle. The SRS control unit can be equipped with an impact sensor. The position of the SRS control unit in combination with use of an impact sensor in the SRS control unit 10 can eliminate the need for certain saving sensors while providing for quick and efficient activation of an SRS. In addition, a method for configuring the SRS can include determining a position of the SRS based on certain side crash testing impact locations for the vehicle.

20 Claims, 5 Drawing Sheets

U.S. PATENT DOCUMENTS

| | | | |
|---|---|---|---|
| 7,438,152 B2* | 10/2008 | Hawes et al. | 180/274 |
| 7,513,525 B2* | 4/2009 | Ueno | 280/735 |
| 7,516,981 B2* | 4/2009 | Hollo et al. | 280/735 |
| 7,539,804 B2* | 5/2009 | Miura | 710/110 |
| 7,541,917 B2* | 6/2009 | Hosokawa | 340/436 |
| 7,606,647 B2* | 10/2009 | Seikai et al. | 701/45 |
| 7,607,510 B1* | 10/2009 | Mun | 180/274 |
| 7,677,643 B2* | 3/2010 | Nakamura et al. | 296/187.08 |
| 7,695,008 B2* | 4/2010 | Kuze et al. | 280/735 |
| 7,784,856 B2* | 8/2010 | Fuchs et al. | 296/187.08 |
| 7,828,370 B2* | 11/2010 | Ohi et al. | 296/187.08 |
| 7,840,325 B2* | 11/2010 | Foo et al. | 701/45 |
| 7,848,885 B2* | 12/2010 | Hayasaka | 701/301 |
| 2001/0037170 A1* | 11/2001 | Morell et al. | 701/45 |
| 2004/0011582 A1 | 1/2004 | Aoki | |
| 2005/0107933 A1* | 5/2005 | Kuroda et al. | 701/45 |
| 2006/0058959 A1* | 3/2006 | Seikai et al. | 701/216 |
| 2006/0074537 A1* | 4/2006 | Shen | 701/45 |
| 2007/0001436 A1* | 1/2007 | Hawes et al. | 280/735 |
| 2007/0114767 A1* | 5/2007 | Miyata et al. | 280/735 |
| 2007/0170779 A1* | 7/2007 | Miura | 307/10.1 |
| 2007/0235996 A1* | 10/2007 | Huh et al. | 280/735 |
| 2008/0054603 A1* | 3/2008 | Breed et al. | 280/729 |
| 2008/0172158 A1* | 7/2008 | Oishi | 701/45 |

* cited by examiner

VEHICLE SUPPLEMENTAL RESTRAINT SYSTEM CONFIGURATION AND METHOD

This application claims the priority benefit under 35 U.S.C. §119 of U.S. Provisional Patent Application No. 61/042,708 filed on Apr. 4, 2008, which is hereby incorporated in its entirety by reference.

BACKGROUND

1. Field

The presently disclosed subject matter relates to a vehicle supplemental restraint system (SRS) that includes a controller, such as a central processing unit, that is located away from positions either at the floor tunnel or underneath the instrument panel. In particular, the disclosed subject matter relates to an SRS in which controller(s) are installed at a vehicle frame's cross-member located underneath or to the rear of the driver, and SRS controllers and SRS devices that include built-in acceleration devices.

2. Brief Description of the Related Art

Many of today's vehicles have both frontal and side airbag systems as well as other supplemental active restraint structures that require quick and accurate judgment and activation. The SRS control unit acts as the brain to provide this quick and accurate control for the system, and any improvement in either speed or accuracy is a long felt need/desire for the SRS control unit art.

Typically, the control unit for an SRS is located in or on the floor tunnel underneath or behind the center counsel and/or underneath the instrument panel. In general, the control unit for an SRS is located towards the front of the vehicle. This position of the SRS control unit makes it difficult to determine certain events, such as a lower impulse crash located towards the rear of the vehicle. The current remedy for boosting the SRS control unit's ability to detect and evaluate such events is to provide additional satellite "g" sensors (in the form of accelerometers, etc.) which can either detect and send data back to the SRS control unit or act as a saving system.

The "g" sensors are devices that work with the control unit to discriminate between crash and non-crash events. These sensors measure the severity of the impact, and are set up so that sudden "negative acceleration" will cause contacts to close. A signal is then sent to the control unit which checks for a signal from various sensors (e.g., front sensor(s), rear sensor(s), side sensor(s), rollover sensor(s), etc.). Depending on the signal strength and sequence of activated sensors, the SRS control unit then determines which and how many airbags and/or other active restraints to deploy and at what level of power to deploy them.

By function, there are two main types of sensors: impact sensors and saving sensors. The front/forward sensors are typically impact sensors that are located in various areas forward of the passenger compartment. For example, the front/forward sensors can be located inside the fenders, on the front frame, etc. The front (and other) sensors can take the form of a typical accelerometers, or can be more advance and include several sensors bundled together. Two general types of accelerometers that can be used as a front/forward sensor include the ball and magnet type sensor and the spring band and roller type sensor. One more specific type of sensor is known as a variable reluctance (VR) speed and position sensor, which is widely used in the automotive industry because of its low cost and high reliability. Unlike other types of sensors, VR sensors are self-excited. They do not require an external voltage source to operate.

Rear sensors are sometimes known as saving sensors when they are only used to determine that a crash has actually occurred. Rear saving sensors can be located in various locations in the passenger compartment. Other saving sensors can actually be integrated with the SRS control unit itself.

Saving sensors, whose purpose is the prevention of malfunction, are incorporated into an SRS to detect an impact from collision simultaneously with the main acceleration sensor in the deployment of the airbag or other restraint. However, there are problems associated with the acceleration sensor for the side airbag or side crash activated devices. In a side collision the crushable zone is smaller than in a head-on collision, so in a side collision, the deployment of the airbag or other restraints must be quicker. Therefore, analog sensors are sometimes used for the side airbags because mechanical lead-switch type saving sensors, used mainly for front collision sensors, have a slow response speed. However, analog sensors can be relatively expensive and subject to electromagnetic disturbance.

The total severity of a vehicle crash cannot be determined until the crash event is complete. However, in certain applications, SRS control units may be required to discriminate the severity of the crash event in the first milliseconds of an impact. Future SRS control units may require even more discrimination capability than current systems to provide separate deployment thresholds for advanced technologies such as multi-staged airbags, pretensioners, and decision shifting for belted and unbelted occupants. Therefore there exists a long felt need to improve both the accuracy and speed of all components of an SRS, including processor speed/accuracy, communication speed/accuracy, sensor speed/accuracy, etc.

SUMMARY

According to an aspect of the disclosed subject matter, a vehicle supplemental restraint system (SRS) configuration can include a vehicle including a front portion, a rear portion, a left side portion, a right side portion, a longitudinal axis extending from the front portion to the rear portion in a forward driving direction of the vehicle, a transverse axis extending from the left side portion to the right side portion and in a direction substantially perpendicular to the longitudinal axis, an engine compartment located in the front portion of the vehicle, a driver/passenger row of seating extending substantially transverse to the longitudinal axis of the vehicle and located between the engine compartment of the vehicle and the rear portion of the vehicle, a first passenger row of seating extending substantially transverse to the longitudinal axis of the vehicle and located between the rear portion of the vehicle and the driver/passenger row of seating, and an instrument panel located between the driver/passenger row of seating and the front portion of the vehicle when the vehicle is viewed from a top view normal to both the longitudinal axis and transverse axis of the vehicle. The system configuration can also include a vehicle frame including a left frame member extending substantially parallel with the longitudinal axis of the vehicle, a right frame member extending substantially parallel with the longitudinal axis of the vehicle, a front cross member connecting the right frame member to the left frame member and located between the driver/passenger row and the front portion of the vehicle and extending substantially perpendicular to the longitudinal axis of the vehicle, and a rearward cross member connecting the right frame member to the left frame member and located between the front cross member and rear portion of the vehicle and extending substantially perpendicular to the longitudinal axis of the vehicle.

An SRS control unit can be located at the rearward cross member of the vehicle frame and configured to receive data, to interpret the data, and to send an actuation signal based on the interpreted data. A front sensor can be located at the front portion of the vehicle and configured to detect acceleration and to communicate data related to the detected acceleration to the SRS control unit. A side sensor can be located at least one of the left side portion and right side portion of the vehicle and configured to detect side acceleration and communicate data related to the detected side acceleration to the SRS control unit. A multiple axis satellite sensor can be located under the instrument panel and between the driver/passenger row of seating and the engine compartment of the vehicle when the vehicle is viewed from a top view normal to both the longitudinal axis and transverse axis of the vehicle. A restraint device can be located in the vehicle and in communication with the SRS control unit, the restraint device configured to be actuated when an actuation signal from the SRS control unit is received.

According to an aspect of the disclosed subject matter, the vehicle SRS configuration can include an SRS control unit that is located between the driver/passenger row of seating and the rear portion of the vehicle when the vehicle is viewed from a top view normal to both the longitudinal axis and transverse axis of the vehicle.

According to an aspect of the disclosed subject matter, the vehicle can include a floor tunnel running under the instrument panel when the vehicle is viewed from a top view normal to both the longitudinal axis and transverse axis of the vehicle, and the multiple axis satellite sensor can be located on, in, or at the floor tunnel running under the instrument panel.

According to an aspect of the disclosed subject matter, the vehicle SRS configuration can include an SRS control unit connected to the rearward cross member by a fastening structure.

According to an aspect of the disclosed subject matter, the vehicle SRS configuration can include an SRS control unit that has a sensor located within the SRS control unit configured to sense a side impact on the vehicle.

According to an aspect of the disclosed subject matter, the vehicle SRS configuration can include an SRS control unit that is connected to the front sensor and side sensor by a communication structure.

According to an aspect of the disclosed subject matter, a vehicle supplemental restraint system (SRS) configuration, can include a vehicle including a front portion, a rear portion, a left side portion, a right side portion, a longitudinal axis extending from the front portion to the rear portion in a forward driving direction of the vehicle, a transverse axis extending from the left side portion to the right side portion and in a direction substantially perpendicular to the longitudinal axis, an engine compartment located in the front portion of the vehicle, a driver/passenger row of seating extending substantially transverse to the longitudinal axis of the vehicle and located between the engine compartment of the vehicle and the rear portion of the vehicle, a first passenger row of seating extending substantially transverse to the longitudinal axis of the vehicle and located between the rear portion of the vehicle and the driver/passenger row of seating, and an instrument panel located between the driver/passenger row of seating and the front portion of the vehicle when the vehicle is viewed from a top view normal to both the longitudinal axis and transverse axis of the vehicle. The configuration can further include a vehicle frame including a left frame member extending substantially parallel with the longitudinal axis of the vehicle, a right frame member extending substantially parallel with the longitudinal axis of the vehicle, a front cross member connecting the right frame member to the left frame member and located between the driver/passenger row and the front portion of the vehicle and extending substantially perpendicular to the longitudinal axis of the vehicle, and a rearward cross member connecting the right frame member to the left frame member and located between the front cross member and rear portion of the vehicle and extending substantially perpendicular to the longitudinal axis of the vehicle. An SRS control unit can be located between the instrument panel and the rear portion of the vehicle when the vehicle is viewed from a top view normal to both the longitudinal axis and transverse axis of the vehicle, the SRS control unit can be configured to receive data, to interpret the data, and to send an actuation signal based on the interpreted data. A front sensor can be located at the front portion of the vehicle and configured to detect acceleration and to communicate data related to the detected acceleration to the SRS control unit. A side sensor can be located at least one of the left side portion and right side portion of the vehicle and configured to detect side acceleration and communicate data related to the detected side acceleration to the SRS control unit. A multiple axis satellite sensor can be located at the instrument panel and between the driver/passenger row of seating and the front cross member of the vehicle when the vehicle is viewed from a top view normal to both the longitudinal axis and transverse axis of the vehicle. A restraint device can be located in the vehicle and in communication with the SRS control unit, the restraint device configured to be actuated when an actuation signal from the SRS control unit is received.

According to an aspect of the disclosed subject matter, a method for configuring a supplemental restraint system (SRS) for a vehicle, can include providing a vehicle including a front portion, a rear portion, a left side portion, a right side portion, a longitudinal axis extending from the front portion to the rear portion in a forward driving direction of the vehicle, a transverse axis extending from the left side portion to the right side portion and in a direction substantially perpendicular to the longitudinal axis, an engine compartment located in the front portion of the vehicle, a driver/passenger row of seating extending substantially transverse to the longitudinal axis of the vehicle and located between the engine compartment of the vehicle and the rear portion of the vehicle, a first passenger row of seating extending substantially transverse to the longitudinal axis of the vehicle and located between the rear portion of the vehicle and the driver/passenger row of seating, and an instrument panel located between the driver/passenger row of seating and the front portion of the vehicle when the vehicle is viewed from a top view normal to both the longitudinal axis and transverse axis of the vehicle. The method can further include providing a vehicle frame including a left frame member extending substantially parallel with the longitudinal axis of the vehicle, a right frame member extending substantially parallel with the longitudinal axis of the vehicle, a front cross member connecting the right frame member to the left frame member and located between the driver/passenger row and the front portion of the vehicle and extending substantially perpendicular to the longitudinal axis of the vehicle, and a rearward cross member connecting the right frame member to the left frame member and located between the front cross member and rear portion of the vehicle and extending substantially perpendicular to the longitudinal axis of the vehicle. The method can further include providing an SRS control unit configured to receive data, to interpret the data, and to send an actuation signal based on the interpreted data. The method can include providing a front sensor at the front portion of the vehicle, the front sensor configured to detect acceleration and communicate data related to the detected acceleration to the SRS control unit. The method can further include providing a side sensor at least one of the left side portion and right side portion of the vehicle, the side sensor configured to detect side acceleration and communicate data related to the detected side acceleration to the SRS control unit. The method can further include determining a location of a testing impact point on the vehicle for at least one of SICE testing, side crash testing, and front crash testing. The method can further include locating the SRS control unit at a specific position on the vehicle based on the location of the testing impact point.

According to an aspect of the disclosed subject matter, locating can include locating the SRS control unit at the rearward cross member.

According to an aspect of the disclosed subject matter, locating can include attaching the SRS control unit to the rearward cross member.

According to an aspect of the disclosed subject matter, providing can include providing a third cross member connecting the right frame member to the left frame member, the third cross member located between the rearward cross member and the rear portion of the vehicle and extending substantially perpendicular to the longitudinal axis of the vehicle, and locating can includes locating the SRS control unit at the third cross member.

According to an aspect of the disclosed subject matter, providing can include providing a third cross member connecting the right frame member to the left frame member, the third cross member located between the rearward cross member and the rear portion of the vehicle and extending substantially perpendicular to the longitudinal axis of the vehicle, and locating includes attaching the SRS control unit to the third cross member.

According to an aspect of the disclosed subject matter, the method can include providing a multiple axis satellite sensor and locating the multiple axis satellite sensor at the instrument panel and between the driver/passenger row of seating and the engine compartment of the vehicle when the vehicle is viewed from a top view normal to both the longitudinal axis and transverse axis of the vehicle.

Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
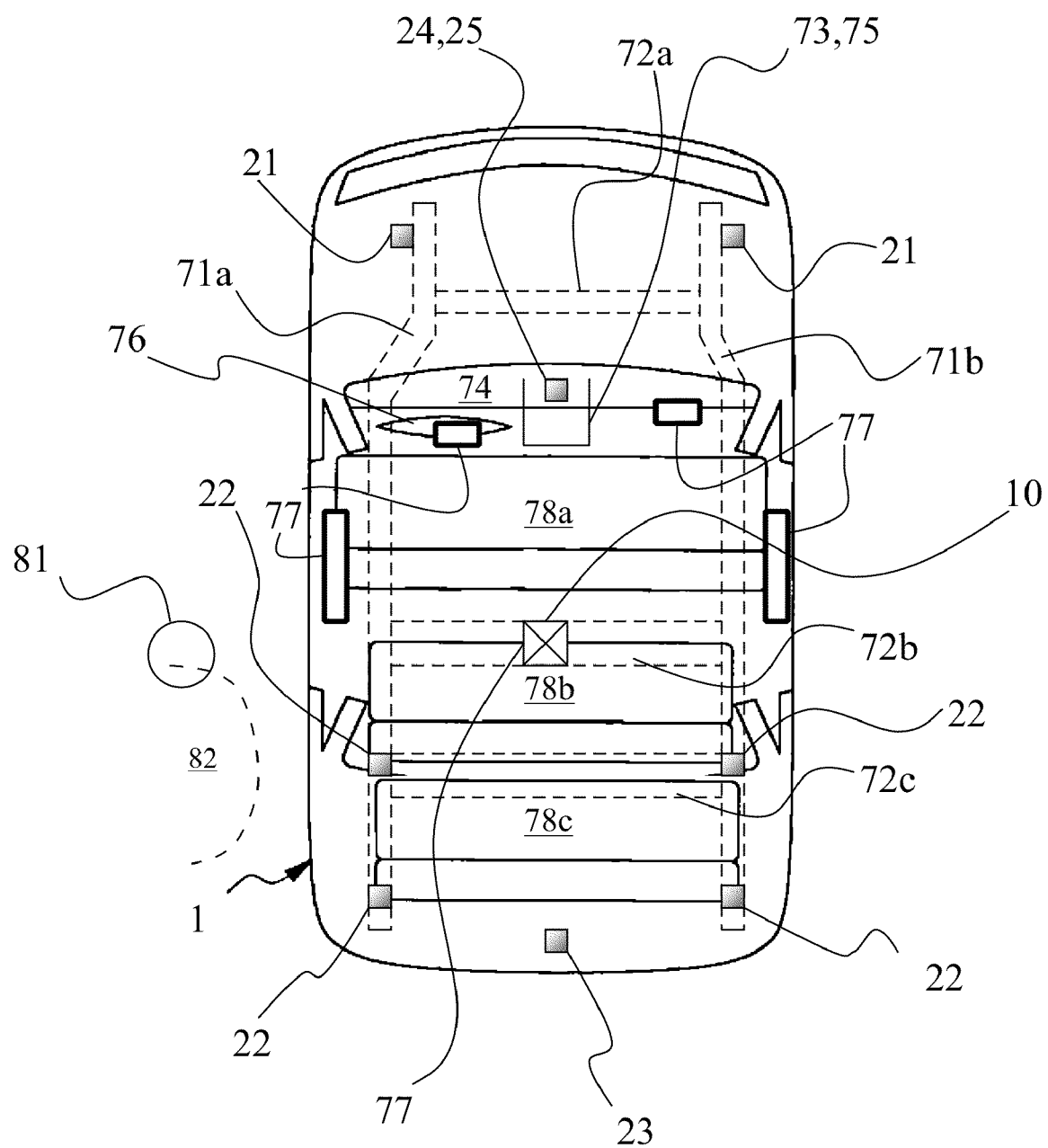
FIG. 1 illustrates a top schematic view of an exemplary SRS configuration in accordance with principles of the disclosed subject matter.

Referring to the drawing figures, like reference numerals designate identical or corresponding elements throughout the several figures.

For side airbags, measurement of the crash acceleration should be made within a short time period, for example, in some cases detection is made in a time frame of less than 3 ms in order to inflate the side airbag in time. A valuation circuit can be provided in the SRS main unit 10 that includes amplification, temperature coefficient compensation, two-wire unidirectional current interfaces, and/or zero-offset compensation. The sensing element for the measurement of acceleration can be an accelerometer.

The sensor measures the real acceleration value. The amplified and filtered analog signal can then be converted into a digital signal. This value can then be transmitted to the SRS main unit 10. The full-scale acceleration range is normally ±100 g and can be adapted to ±50 g.

FIG. 1 shows a top view of an example of an SRS configuration made in accordance with principles of the presently disclosed subject matter. The SRS configuration can include a vehicle 1 that has a front portion located near the headlight area of the vehicle and a rear portion located near the taillight area of the vehicle. The vehicle 1 can include a driver/passenger row 78a that includes one or more seats aligned from side to side in a transverse direction in the vehicle 1. A first backseat row 78b can be located behind the driver/passenger row 78a and followed by a second backseat row 78c. The rows 78a-78c can be substantially parallel with respect to each other and with respect to a transverse axis of the vehicle. The vehicle 1 can also include a left side frame 71a and a right side frame 71b. Cross members 72a, 72b, and 72c extend between and connect the left side frame 71a and right side frame 71b. The cross members 72a, 72b, and 72c can be substantially parallel with respect to each other and substantially perpendicular to the longitudinal axis of the vehicle.

The SRS can include an SRS control unit 10, a plurality of sensors 21-25, and a plurality of restraint devices 77. The sensors can include front crash sensor(s) 21, side impact sensor(s) 22, rear crash sensor(s) 23, rollover sensor(s) 24, and multi-axis satellite sensor(s) 25. The restraint devices 77 can include air bags, active seat belts, pretensioners, multi-stage air bags or cushions, active positioning devices, etc. The restraint devices 77 can be placed in various locations throughout the vehicle, examples of locations being set forth in the attached drawings. In particular, a restraint device 77 can be configured as a side airbag(s) or air curtain(s) that is/are actuated during a side impact crash. The restraint device can also be configured as an air bag located in the steering wheel 76 of the vehicle 1 or in the instrument panel/dashboard 74 of the vehicle 1.

The SRS control unit 10 is connected to the restraint device(s) 77 by a communication structure which can be in the form of wires or possibly even in the form of a wireless communication system (communication via electromagnetic, infrared, or radio frequency signals). The SRS control unit 10 can also be connected to the various sensors 21-25 via a similar or identical communication structure (wires or wireless). The SRS control unit 10 can include a processor unit that is programmed or otherwise configured to make determinations regarding whether to send an actuation signal to the restraining devices 77 based on information received from any or all of the sensors 21-25.

As shown in FIG. 1, the SRS control unit 10 is not located in its traditional position under the instrument panel 74 of the vehicle. Instead, the SRS control unit 10 is located at, on top of, or connected to the middle cross member 72b. The SRS control unit 10 can be connected to the middle cross member 72b via a fastening structure(s), such as screws, bolts, plates, snap fit structures, adhesives, clamps, etc. This rearward placement of the SRS control unit 10 allows it to sense a side impact with greater speed and accuracy. In addition, placement of the SRS control unit 10 at the middle cross member 72b can allow the SRS to perform better in standard crash tests such as the Side Impact Crash Worthiness Evaluation (SICE) as well as standard side crash tests in which the vehicle 1 is impacted with or against an object 81 such a pole or a barrier. In addition, the placement of the SRS control unit 10 allows the control unit 10 to act as the saving mechanism in side crashes. An additional saving sensor can be used in the 2nd row of the vehicle to safe for non-fire crash modes when the main unit 10 cannot recognize the signal. By moving the SRS control unit 10 rearward, it can safe for all side impact tests. Thus, the configuration can provide cost savings due to a reduction in parts and reduced manufacturing process requirements. Thus, the main SRS control unit 10 can provide cost reduction while allowing for efficient saving of all side impact crashes. In addition, the stiffness of the mounting bracket that mounts the SRS control unit to the vehicle can be reduced due to its direct attachment to a cross member 72a-d. The mounting of the SRS control unit 10 to a cross member 72a-d can also eliminate the need for a rear most side impact sensor (see FIG. 3), such as the typical side impact sensor currently mounted at the third row cross member in certain vehicles.

Because there is a small crumple zone in a side crash, the time between initiation of the crash and deployment of a side restraint device 77 is small. Therefore, placement of the SRS control unit 10, and inclusion of a sensor 77 on the SRS control unit 10 can provide a strong impact or crash signal immediately to the SRS control unit 10. The provision of the SRS control unit 10 closer to the side crash location can eliminate the need for certain saving sensors. In addition, the use of front sensors 21 allows the SRS control unit 10 to actuate appropriate restraint device(s) 77 in time during a front crash because the duration of a front crash is greater than the duration of a side crash.

Because the SRS control unit 10 is not located in the traditional position(s) (i.e., under/behind the instrument panel 74, under/behind the center console 75, and/or in or on the floor tunnel 73 in a frontward area of the vehicle), there is an opportunity to utilize these now vacant traditional position(s) to include sensors or other devices that can improve the speed, accuracy, etc., of the SRS. In particular, a multi-axis satellite sensor 25 can be located in these traditional position(s) to further improve front crash performance for the SRS control unit 10. In addition, the rearward position of the SRS control unit 10 in this embodiment improves its ability to detect side pole or barrier impacts (i.e., side impacts against an object 81). The signal strength from the side impact sensor(s) 22 is improved. In addition, time may be reduced in which the signal propagates via the cross member 72b to the SRS control unit 10 when a side sensor is located in the SRS control unit 10.

Figure 2:
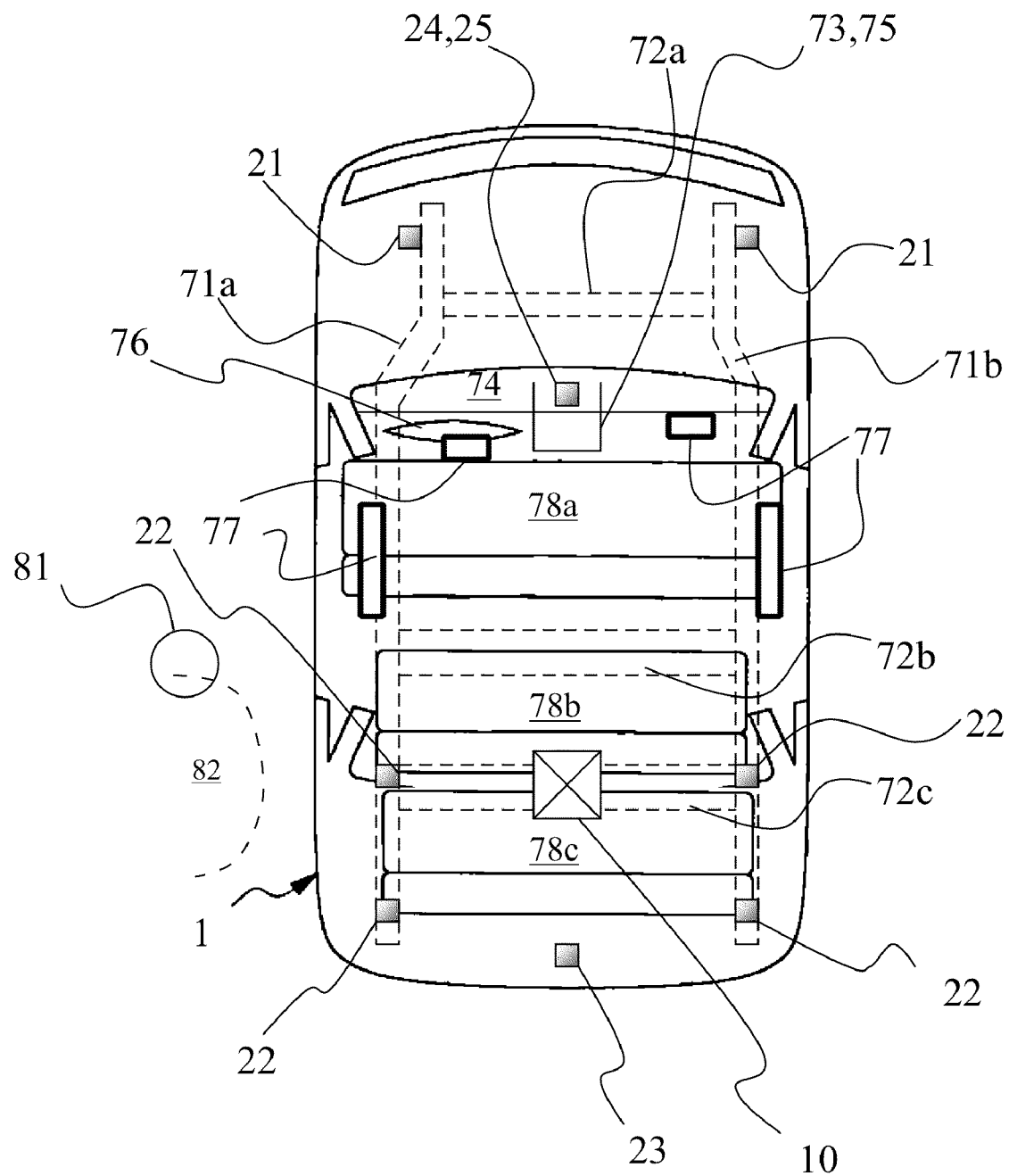
FIG. 2 illustrates a top schematic view of another exemplary SRS configuration in accordance with principles of the disclosed subject matter.

FIG. 2 shows another embodiment of the SRS configuration of the disclosed subject matter. In this example, the SRS control unit 10 is located on a rear cross member 72c located even further rearward in the vehicle 1 than the middle cross member 72b. In this embodiment, the SRS control unit 10 may perform well during SICE testing events due to the location of SICE testing and relative location of the SRS control unit 10. Again, a multi-axis satellite sensor 25 can be located in the traditional position for the SRS control unit 10 (i.e., under/behind the instrument panel, under/behind the center console, and/or in or on the floor tunnel in a frontward area of the vehicle) to further improve front crash performance for the SRS control unit 10.

If the vehicle layout has a gap between the side pole and SICE impact point (as shown in FIG. 1), the location of the SRS control unit 10 can be determined in order to line up with either the middle cross member 72b or rear cross member 72c (or other location) depending on sensing logic and/or priorities. Specifically, if it is determined that the SICE impact point location will be closer to the third cross member 72c of vehicle 1, then the SRS control unit 10 can be located at the third cross member 72c to ensure optimal performance of the SRS control unit 10 during the SICE testing. Likewise, the impact point location can be determined for side pole or barrier crash testing and then the location of the SRS control unit 10 can be determined for optimal performance. If the impact location on the vehicle 1 for the SICE testing and side crash testing are spaced apart, then the position of the SRS control unit 10 can be determined and certain sensing logic/priorities can be programmed or set for the SRS control unit 10 to optimize the crash performance for both SICE and side crash testing. IN other words, the SRS control unit 10 can be located at or on either of the middle cross member 72b or rear cross member 72c depending on the sensing logic/priorities.

Figure 3:
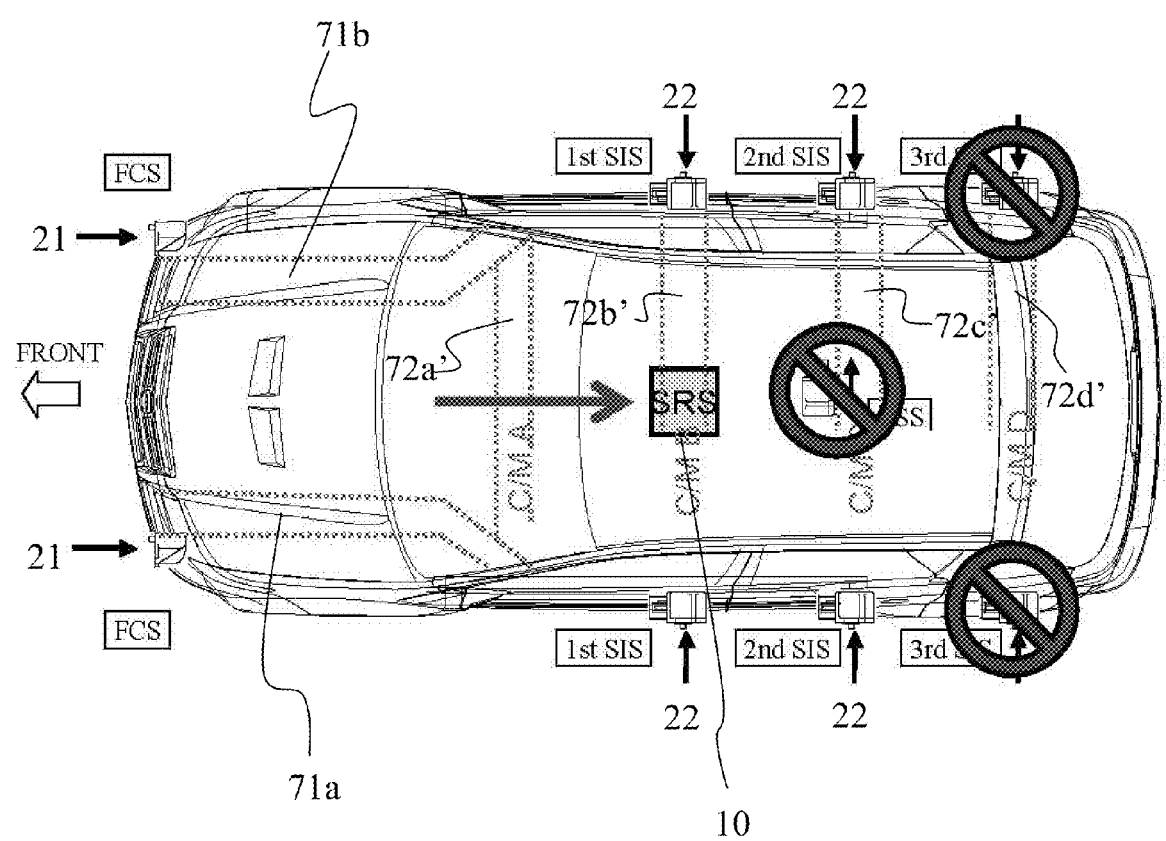
FIG. 3 illustrates a top schematic view of another exemplary SRS configuration in accordance with principles of the disclosed subject matter.

FIG. 3 shows another embodiment of an SRS configuration of the disclosed subject matter. In this example, the SRS control unit 10 is located on the middle cross member 72b which is the second cross member of a row of cross members 72, 72b, 72c, and 72d. The drawings show that the rearmost of the left and right rear side impact sensors 22 that are typically used in supplemental restraint systems may not be necessary to safe the operation of the SRS control unit 10 in this embodiment due to the positioning of the SRS control unit 10 and the physical attachment to cross member 72b. In addition, a rear impact sensor 23 may not be necessary when the configuration shown in FIGS. 1-3 is utilized, as shown in FIG. 3. Additionally, a separate saving sensor is not required, which otherwise would have been located on cross member 72c at a center of the vehicle. Again, a multi-axis satellite sensor 25 can be located in the traditional position for the SRS control unit 10 (i.e., under/behind the instrument panel, under/behind the center console, and/or in or on the floor tunnel in a frontward area of the vehicle) to further improve front crash performance for the SRS control unit 10. The SRS control unit 10 can also include a sensor such as an acceleration sensor that provides at least one of side impact sensing and rear impact sensing. The sensor of the SRS control unit 10 can provide saving for at least one of the side impact sensor(s) and/or the rear impact sensor(s), and a single sensor can be used to provide the side and rear impact saving (or other) sensor at the SRS control unit. Thus, the main SRS control unit 10 can provide cost reduction while allowing for efficient saving of all side impact crashes and/or rear impact crashes.

Figure 4A:
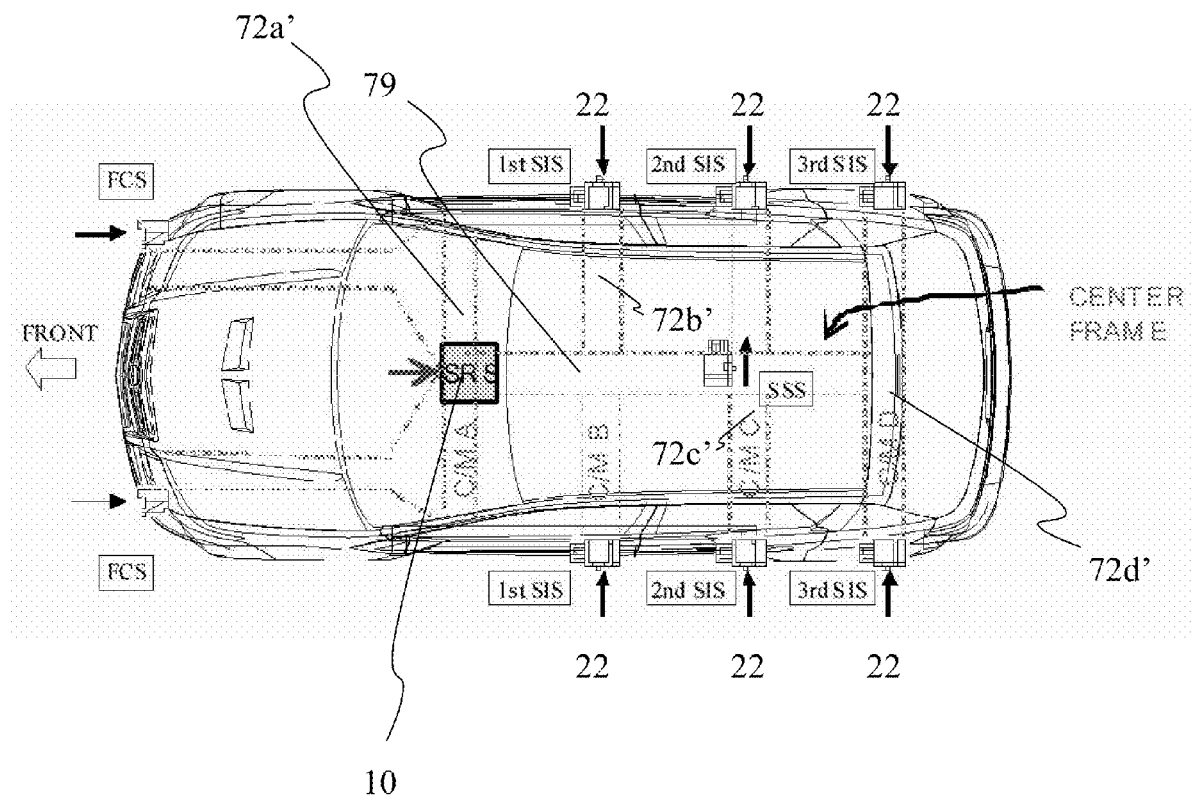
FIG. 4a illustrates a top schematic view of another exemplary SRS configuration in accordance with principles of the disclosed subject matter.
Figure 4B:
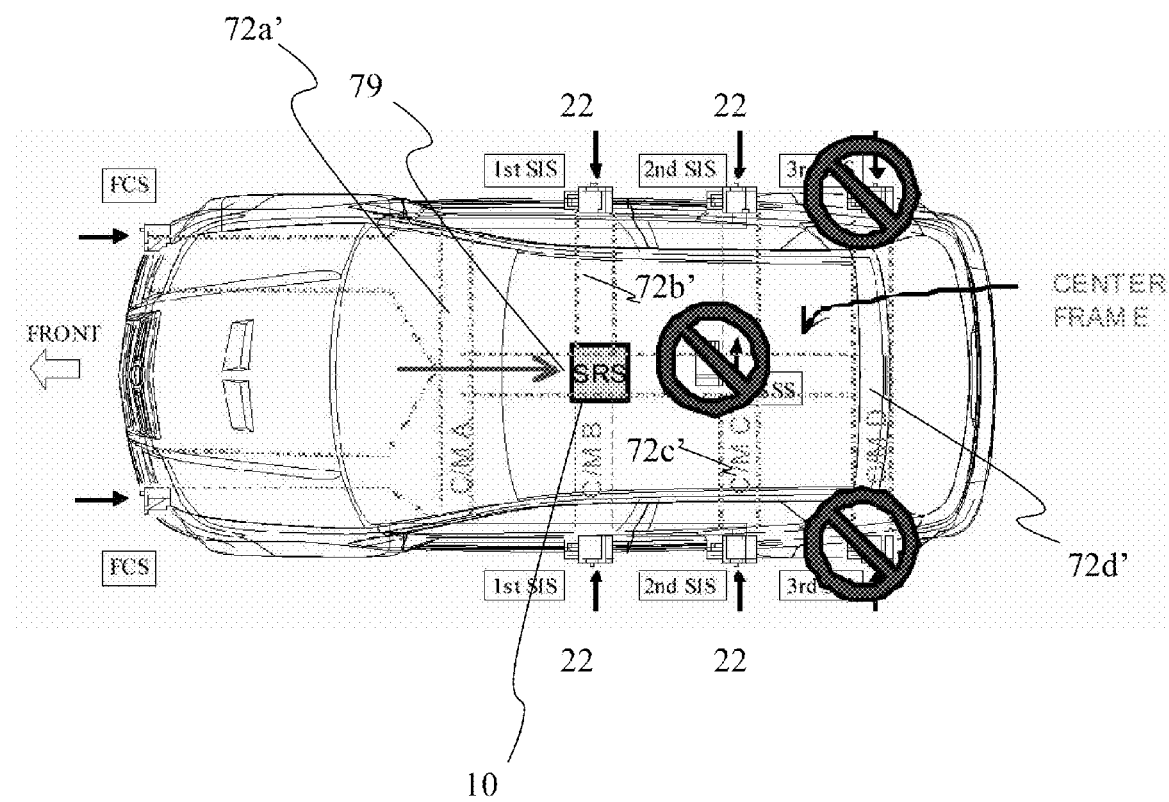
FIG. 4b illustrates a top schematic view of another exemplary SRS configuration in accordance with principles of the disclosed subject matter.

FIGS. 4a and 4b show two additional embodiments of an SRS configuration of the disclosed subject matter. In these examples, the SRS control unit 10 is located on a center frame and/or floor tunnel 79 that extends substantially along a longitudinal axis of the vehicle 1. The SRS control unit 10 is not necessarily attached directly to the center frame and/or floor tunnel 79. Rather, a relatively stiff bracket can be used to attach the SRS control unit 10 to the center frame and/or floor tunnel 79. In addition, the SRS control unit 10 can be mounted at an intersection between one of the cross members 72a'-72d' and the center frame and/or floor tunnel 79. In the embodiments shown in FIGS. 4a and 4b, the cross members 72a'-72d' connect through a side of the center frame and/or floor tunnel 79. The cross members 72a'-72d' do not run completely side-to-side. Instead, they terminate at the center frame and/or floor tunnel 79. In this configuration, the main SRS control unit 10 would actually be mounted on top of the center frame tunnel, but still in-line with the side cross members 72a'-72d' to take advantage of quick communication of a side impact through the side cross members 72a'-72d'.

In FIG. 4a, the SRS control unit 10 can be attached to or located at the front cross member 72a', which is the first most frontward (in a longitudinal direction of the vehicle) cross member of a row of cross members 72a', 72b', 72c', and 72d'. Nonetheless, the SRS control unit is still located further rearward (in the longitudinal direction of the vehicle) than the instrument panel location, and can provide good functionality due to, among other factors, the rigid connection between the cross members 72a', 72b', 72c', and 72d' and the center frame 79, and selected location of sensors 22, 23, etc.

In FIG. 4b, the SRS control unit 10 can be attached to or located at a more rearward cross member 72b' (or even possibly at cross member 72c' or 72d'). The SRS control unit 10 is located substantially rearward (in a longitudinal direction of the vehicle) than the instrument panel location. The relative rearward position of the SRS control unit 10 can remove the need/desire for the rearmost side impact sensors (shown as struck through in the figure), and can also remove the need/desire for a separate saving sensor located, for example, at cross member 72c (and shown as struck through in the figure).

Thus, the rearmost of the left and right rear side impact sensors 22 that are typically used in supplemental restraint systems may not be necessary to safe the operation of the SRS control unit 10 due to the positioning of the SRS control unit 10 and the physical attachment to cross member 72b' and/or center frame 79. In addition, a rear impact sensor 23 may not be necessary when the configuration shown in FIGS. 4a and 4b is utilized. Again, a multi-axis satellite sensor 25 can be located in the traditional position for the SRS control unit 10 (i.e., under/behind the instrument panel, under/behind the center console, and/or in or on the floor tunnel in a frontward area of the vehicle) to further improve front crash performance for the SRS control unit 10. The SRS control unit 10 can also include a sensor such as an acceleration or rollover sensor that provides at least one of side impact sensing, rear impact sensing, and rollover sensing. The sensors of the SRS control unit 10 can provide saving for at least one of the side impact sensor(s) and/or the rear impact sensor(s) an/or rollover sensor(s), and a single sensor can be used to provide the side and rear impact saving (or other) sensor at the SRS control unit. Thus, the main SRS control unit 10 can provide cost reduction while allowing for efficient saving of all side impact crashes and/or rear impact crashes.

It should be noted that several of the disclosed structures that make up the SRS configuration and method can be varied in terms of shape, size, material, connections, etc., without departing from the spirit and scope of the presently disclosed subject matter. For example, the floor tunnel 73, instrument panel 74, and center console 75 are shown in schematic form and can be differently shaped and sized. Also, while the SRS control unit 10 is shown as connected at a central portion of the vehicle 1, it could also be positioned closer to either the left or right sides of the vehicle 1. In addition, multiple SRS control units 10 could be placed on either side of the vehicle's center line (or spaced otherwise) to further improve side crash performance (or other targeted crash performance) for the SRS.

It is also contemplated that a rollover sensor could be provided and combined with the SRS control unit 10 in any of the above described and other embodiments to provide for further capabilities and/or further reduction in parts and installation procedures.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A vehicle supplemental restraint system (SRS) configuration, comprising:

a vehicle including a front portion, a rear portion, a left side portion, a right side portion, a longitudinal axis extending from the front portion to the rear portion in a forward driving direction of the vehicle, a transverse axis extending from the left side portion to the right side portion and in a direction substantially perpendicular to the longitudinal axis, an engine compartment located in the front portion of the vehicle, a driver/passenger row of seating extending substantially transverse to the longitudinal axis of the vehicle and located between the engine compartment of the vehicle and the rear portion of the vehicle, a first passenger row of seating extending substantially transverse to the longitudinal axis of the vehicle and located between the rear portion of the vehicle and the driver/passenger row of seating, and an instrument panel located between the driver/passenger row of seating and the front portion of the vehicle when the vehicle is viewed from a top view normal to both the longitudinal axis and transverse axis of the vehicle;

a vehicle frame including a left frame member extending substantially parallel with the longitudinal axis of the vehicle, a right frame member extending substantially parallel with the longitudinal axis of the vehicle, a front cross member connecting the right frame member to the left frame member and located between the driver/passenger row and the front portion of the vehicle and extending substantially perpendicular to the longitudinal axis of the vehicle, and a rearward cross member connecting the right frame member to the left frame member and located between the front cross member and rear portion of the vehicle and extending substantially perpendicular to the longitudinal axis of the vehicle;

an SRS control unit located at the rearward cross member of the vehicle frame and configured to receive data, to interpret the data, and to send an actuation signal based on the interpreted data;

a front sensor located at the front portion of the vehicle and configured to detect acceleration and to communicate data related to the detected acceleration to the SRS control unit;

a side sensor located at least one of the left side portion and right side portion of the vehicle and configured to detect side acceleration and communicate data related to the detected side acceleration to the SRS control unit;

a satellite sensor located under the instrument panel and between the driver/passenger row of seating and the engine compartment of the vehicle when the vehicle is viewed from a top view normal to both the longitudinal axis and transverse axis of the vehicle; and a restraint device located in the vehicle and in communication with the SRS control unit, the restraint device configured to be actuated when an actuation signal from the SRS control unit is received.

2. The vehicle SRS configuration according to claim 1, wherein the SRS control unit is located between the driver/passenger row of seating and the rear portion of the vehicle when the vehicle is viewed from a top view normal to both the longitudinal axis and transverse axis of the vehicle.

3. The vehicle SRS configuration according to claim 1, wherein the vehicle includes a floor tunnel/center frame running under the instrument panel when the vehicle is viewed from a top view normal to both the longitudinal axis and transverse axis of the vehicle, and the satellite sensor is a multiple axis satellite sensor located on the floor tunnel running under the instrument panel.

4. The vehicle SRS configuration according to claim 1, wherein the SRS control unit is connected to the rearward cross member by a fastening structure.

5. The vehicle SRS configuration according to claim 1, wherein the SRS control unit includes a sensor located within the SRS control unit configured to sense an impact on the vehicle, and the sensor located within the SRS control unit is configured to perform at least one of side impact and rear impact safing functions.

6. The vehicle SRS configuration according to claim 1, wherein the SRS control unit is connected to the front sensor and side sensor by a communication structure.

7. A vehicle supplemental restraint system (SRS) configuration, comprising:

a vehicle including a front portion, a rear portion, a left side portion, a right side portion, a longitudinal axis extending from the front portion to the rear portion in a forward driving direction of the vehicle, a transverse axis extending from the left side portion to the right side portion and in a direction substantially perpendicular to the longitudinal axis, an engine compartment located in the front portion of the vehicle, a driver/passenger row of seating extending substantially transverse to the longitudinal axis of the vehicle and located between the engine compartment of the vehicle and the rear portion of the vehicle, a first passenger row of seating extending substantially transverse to the longitudinal axis of the vehicle and located between the rear portion of the vehicle and the driver/passenger row of seating, and an instrument panel located between the driver/passenger row of seating and the front portion of the vehicle when the vehicle is viewed from a top view normal to both the longitudinal axis and transverse axis of the vehicle;

a vehicle frame including a frame member extending substantially parallel with the longitudinal axis of the vehicle, a front cross member located between the driver/passenger row and the front portion of the vehicle and extending substantially perpendicular to the longitudinal axis of the vehicle, and a rearward cross member located between the front cross member and rear portion of the vehicle and extending substantially perpendicular to the longitudinal axis of the vehicle;

an SRS control unit located between the instrument panel and the rear portion of the vehicle when the vehicle is viewed from a top view normal to both the longitudinal axis and transverse axis of the vehicle, the SRS control unit configured to receive data, to interpret the data, and to send an actuation signal based on the interpreted data;

a front sensor located at the front portion of the vehicle and configured to detect acceleration and to communicate data related to the detected acceleration to the SRS control unit;

a side sensor located at either end of the rearward cross member and each side sensor being configured to detect side acceleration and communicate data related to the detected side acceleration to the SRS control unit;

a restraint device located in the vehicle and in communication with the SRS control unit, the restraint device configured to be actuated when an actuation signal from the SRS control unit is received; and a satellite sensor located at the instrument panel and between the driver/passenger row of seating and the front cross member of the vehicle when the vehicle is viewed from a top view normal to both the longitudinal axis and transverse axis of the vehicle.

8. The vehicle SRS configuration according to claim 7, wherein the SRS control unit is located between the driver/passenger row of seating and the rear portion of the vehicle when the vehicle is viewed from a top view normal to both the longitudinal axis and transverse axis of the vehicle.

9. The vehicle SRS configuration according to claim 7, wherein the vehicle includes a floor tunnel running under the instrument panel when the vehicle is viewed from a top view normal to both the longitudinal axis and transverse axis of the vehicle, and the satellite sensor is a multiple axis satellite sensor located on the floor tunnel running under the instrument panel.

10. The vehicle SRS configuration according to claim 7, wherein the SRS control unit is connected to the rearward cross member by a fastening structure.

11. The vehicle SRS configuration according to claim 7, wherein the SRS control unit includes a sensor located within the SRS control unit configured to sense an impact on the vehicle, and the sensor located within the SRS control unit is configured to perform at least one of side impact and rear impact safing functions.

12. The vehicle SRS configuration according to claim 7, wherein the SRS control unit is connected to the front sensor and side sensor by a communication structure.

13. The vehicle supplemental restraint system (SRS) configuration according to claim 7, wherein the frame member is a center frame extending along a longitudinal axis of the vehicle and intersecting the rearward cross member at a substantial center of the rearward cross member and in a substantially perpendicular orientation with respect to the rearward cross member, the SRS unit connected to the center frame and the rearward cross member including two separate structures each joined to the center frame and extending perpendicularly from the center frame.

14. A method for configuring the vehicle supplemental restraint system (SRS) as described in claim 7, comprising:

providing the vehicle including the front portion, the rear portion, the left side portion, the right side portion, the longitudinal axis extending from the front portion to the rear portion in the forward driving direction of the vehicle, the transverse axis extending from the left side portion to the right side portion and in the direction substantially perpendicular to the longitudinal axis, the engine compartment located in the front portion of the vehicle, the driver/passenger row of seating extending substantially transverse to the longitudinal axis of the vehicle and located between the engine compartment of the vehicle and the rear portion of the vehicle, the first passenger row of seating extending substantially transverse to the longitudinal axis of the vehicle and located between the rear portion of the vehicle and the driver/passenger row of seating, and the instrument panel located between the driver/passenger row of seating and the front portion of the vehicle when the vehicle is viewed from the top view normal to both the longitudinal axis and transverse axis of the vehicle;

providing the vehicle frame including the front cross member located between the driver/passenger row and the front portion of the vehicle and extending substantially perpendicular to the longitudinal axis of the vehicle, and the rearward cross member located between the front cross member and rear portion of the vehicle and extending substantially perpendicular to the longitudinal axis of the vehicle;

providing the SRS control unit configured to receive data, to interpret the data, and to send the actuation signal based on the interpreted data;

providing the front sensor at the front portion of the vehicle, the front sensor configured to detect acceleration and communicate data related to the detected acceleration to the SRS control unit;

providing the side sensor at least one of the left side portion and fight side portion of the vehicle, the side sensor configured to detect side acceleration and communicate data related to the detected side acceleration to the SRS control unit;

determining a location of a testing impact point on the vehicle for at least one of SICE testing, side crash testing, and front crash testing; and locating the SRS control unit at a specific position on the vehicle based on the location of the testing impact point.

15. The method according to claim 14, wherein locating includes locating the SRS control unit at the rearward cross member.

16. The method according to claim 14, wherein locating includes attaching the SRS control unit directly to at least one of the rearward cross member and a center frame extending along the longitudinal axis of the vehicle.

17. The method according to claim 14, wherein providing includes providing a third cross member connecting the right frame member to the left frame member, the third cross member located between the rearward cross member and the rear portion of the vehicle and extending substantially perpendicular to the longitudinal axis of the vehicle, and locating includes locating the SRS control unit at the third cross member.

18. The method according to claim 14, wherein providing includes providing a third cross member connecting the right frame member to the left frame member, the third cross member located between the rearward cross member and the rear portion of the vehicle and extending substantially perpendicular to the longitudinal axis of the vehicle, and locating includes attaching the SRS control unit to the third cross member.

19. The method according to claim 14, further comprising:
providing a satellite sensor; and
locating the satellite sensor at the instrument panel and between the driver/passenger row of seating and the engine compartment of the vehicle when the vehicle is viewed from a top view normal to both the longitudinal axis and transverse axis of the vehicle.

20. The method according to claim 14, further comprising:
providing the SRS control unit with an impact sensor and safing at least one of the side sensor and a rear impact sensor using the impact sensor located on the SRS control unit.

* * * * *